Figure 3:
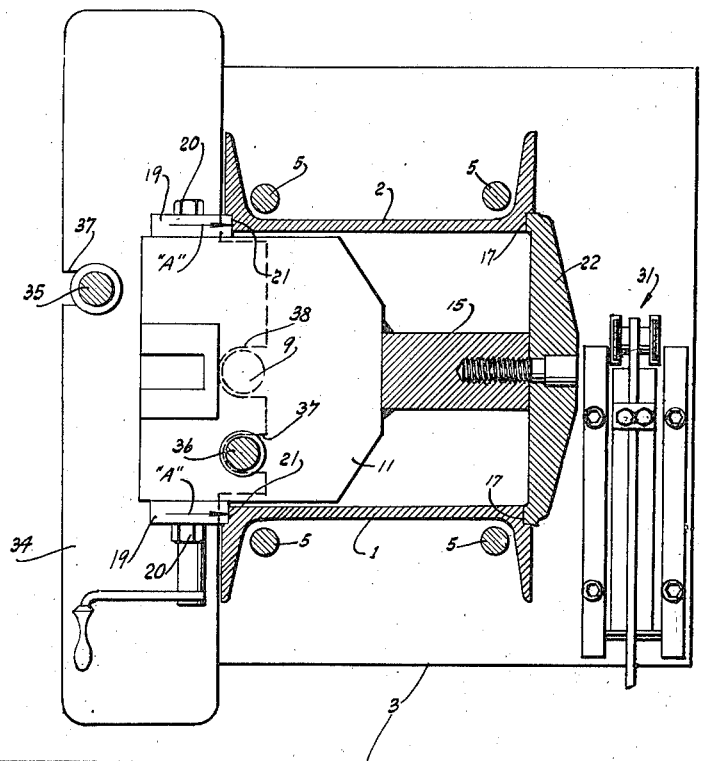

Feb. 1, 1949.  A. SONNTAG  2,460,771
MATERIALS TESTING MACHINE
Filed June 19, 1945  2 Sheets-Sheet 1
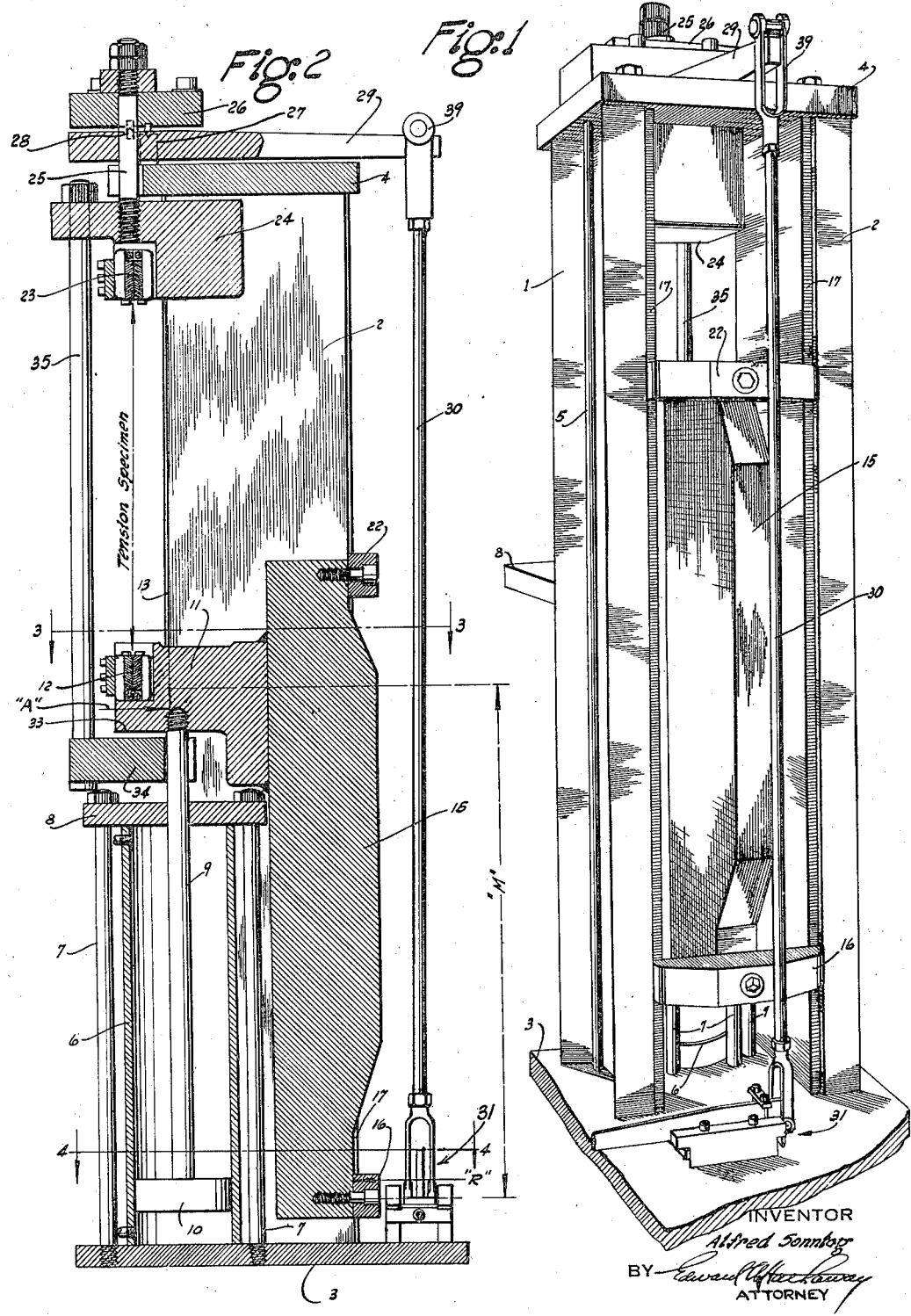

Feb. 1, 1949.   A. SONNTAG   2,460,771
MATERIALS TESTING MACHINE
Filed June 19, 1945   2 Sheets-Sheet 2

INVENTOR
Alfred Sonntag
ATTORNEY

Patented Feb. 1, 1949

2,460,771

UNITED STATES PATENT OFFICE 2,460,771

MATERIALS TESTING MACHINE

Alfred Sonntag, Greenwich, Conn., assignor, by mesne assignments, to The Baldwin Locomotive Works, a corporation of Pennsylvania Application June 19, 1945, Serial No. 600,320

4 Claims. (Cl. 73—93)

1

This invention relates generally to materials testing machines, particularly for testing in tension, compression and transverse bending.

One object of my invention is to provide an improved testing machine that is relatively simple and economical in construction, operation and maintenance combined not only with compactness, sturdiness and precision of operation but also accessibility of parts and of ease in inserting specimens in and removing them from the machine.

Another object is to provide an improved testing machine in which the parts are so constructed and arranged that standard structural shapes may be effectively employed in a precision materials testing machine.

In accomplishing the foregoing as well as other objects I have provided a hydraulic type materials testing machine in which the specimen is offset with respect to the loading mechanism so that the specimen is located well forwardly of the main frame so as to be fully accessible but this has the decided disadvantage of eccentric loading forces. Normally, the axis of the hydraulic loading mechanism would be symmetrically arranged so as to be substantially in alignment with the specimen but this has the disadvantage of the loading cylinder extending forward and consequently tends to make the operator stand away from the machine as well as creating a bulky structure requiring desirable floor space, although the symmetrical arrangements have the advantage of straight line transmission of loading forces from the loading mechanism to the specimen so as to insure true axial loading thereof.

However, I retain the advantage of offset accessibility without its disadvantages and at the same time I obtain the advantages of the symmetrical type machine with its true axial specimen loading but without its disadvantages. I accomplish all of this by causing the eccentric loading forces, which are produced by the offset relation of my hydraulic loading mechanism to the specimen engaging platen, to be converted into a true axial loading of the specimen through a particular arrangement of a moment arm connected to the platen. This arm is capable of having a very great length, without increasing the height of the machine, by an effective cooperative relation to the loading cylinder, specifically by having the arm disposed in a parallel plane behind the cylinder and movable into overlapping relation therewith. This is utilized in combination with widely spaced vertical portions

2 of the front and rear surfaces of a frame forming bearing surfaces for the moment arm, thereby providing a simple and effective stabilizing force couple for the eccentrically positioned loading ram. The foregoing inter-relation of parts allows the forces and counter-forces to be effectively taken care of with minimum structural strength while maintaining maximum rigidity together with flexibility of operation.

Figure 4:
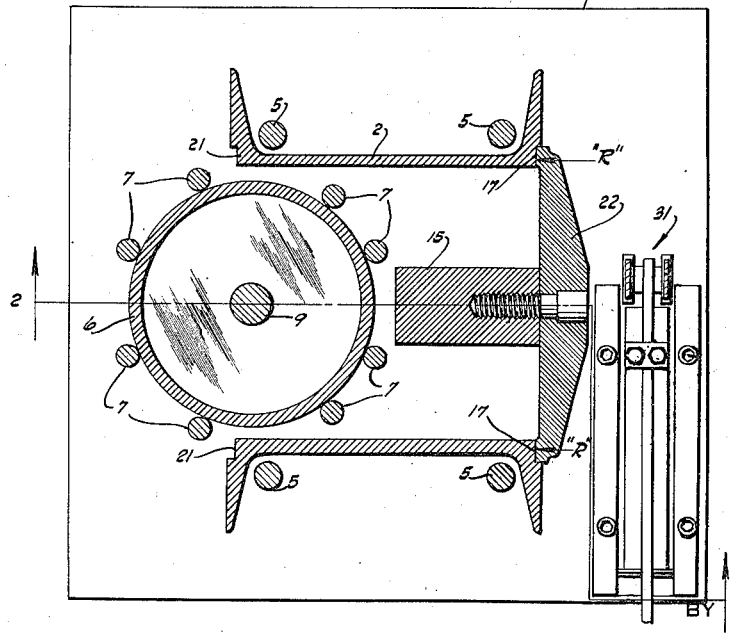

Other objects and advantages will be more apparent to those skilled in the art from the following description of the accompanying drawings in which:

Fig. 1 is a perspective of my improved testing machine viewed from the rear thereof;

Fig. 2 is a vertical section through the machine taken substantially on the line 2—2 of Fig. 4; and Figs. 3 and 4 are horizontal sections taken respectively substantially on the lines 3—3 and 4—4 of Fig. 2.

In the particular embodiment of the invention as disclosed herein merely for the purpose of illustration, I have shown my improved machine as comprising two structural side channels 1 and 2, Figs. 1, 3 and 4, with their backs facing each other and extending vertically from and secured to a base plate 3. An upper plate 4 is seated upon and connects the upper ends of the side channels while a series of tie bolts 5 hold these elements rigidly together which, if desired, may be supplemented by welding at any desired joints. A hydraulic loading mechanism includes a cylinder 6 clamped to the base by a series of rods 7 extending through a plate type cylinder head 8 which may be provided with suitable packing (not shown) for a piston rod 9 actuated by a piston 10. Fluid pressure from any suitable source (not shown) is supplied to the top side of piston 10 (the lower side then being open to exhaust) to transmit a loading force to a loading head 11 which is vertically movable. The head contains a lower set of tension grips 12 disposed at the forward side thereof in a plane well in advance of the front edge 13 of the side channels thereby providing maximum accessibility to the grips and specimen although involving an offset or eccentric relation of the loading ram with respect to the position of the specimen axis relative to the loading head 11. However, this is overcome in an effective manner by securing the loading head 11, through welding or bolts, to a relatively long vertical moment arm 15 which is adapted to extend in overlapping relation to substantially the full length of cylinder 6 when the head is in its lowermost position. The lower end of arm 15 which is shown in Figs. 1, 3 and 4 is a relatively narrow but deep member to which is removably secured at its lowermost end a cross guide 16. This guide slides on two recessed vertical guideways 17, Fig. 3, machined in the rear flanges of channels 1 and 2. A pair of guides 19, Fig. 3, removably secured by bolts 20 to the edges of head 11, are slidable on a pair of vertical guideways 21 machined in the front flanges of the channels. A nominal retainer bar 22, Figs. 1 and 3, may be secured to the upper end of arm 15 and slidable in the rear grooves 17.

A specimen (not shown), but whose position or longitudinal axis is indicated by a line with the legend "Tension specimen" in Fig. 2, is secured at its upper end in a pair of grips 23 disposed in a sensitive weighing head 24, this head and the platen 11 constituting opposed specimen engaging members. The head 24 is supported through a rod 25, coaxial with the specimen axis, to a lever 26 supported on laterally disposed knife edges 27 and stationary rests. The head also has knife edge contact 28 with a lever 29 which in turn is connected through a knife edge to a vertical link 30 extending down to a multi-load range shifting mechanism generally indicated at 31 and constituting the subject matter of a copending application Serial No. 708,982, filed November 9, 1946, now Patent No. 2,447,778, issued August 24, 1948.

In operation, the platen 11 may be raised to any desired position depending upon the length of specimen by supplying fluid to the underside of piston 10 and exhausting fluid from the upper side thereof whereas during loading fluid is supplied to the upper side of piston 10 and exhausted on the lower side thereof for either tension or compression testing. In either case the loading force on platen 11 to the specimen tends to cause eccentric forces to be created in the platen and loading mechanism but this is counteracted by reason of front guides 19 exerting a force to the right as indicated by arrows A, Figs. 2 and 3, whereas guides 16 exert a force to the left as indicated by arrows R respectively constituting action and reaction forces which are maintained relatively small by reason of the relatively long moment arm represented approximately by the distance M, Fig. 2.

Compression specimens are placed between the lower side 33 of head 11 and a platen 34 which is secured by a pair of rods 35 and 36, Fig. 3, to the weighing head 24, Fig. 2. Hence, during downward compression testing the load to be weighed is transmitted to head 24 which then functions in identically the same manner as during the tension test. The platen or table 34 may be notched as at 37, 37 to receive the rods 35 and 36 and can also be notched as at 38 to allow piston rod 9 to extend freely upwardly.

From the foregoing disclosure it is seen that I have provided a very simple and effective materials testing machine which may be manufactured relatively economically while at the same time retaining the many desirable qualities of precision, durability, ease of accessibility and flexibility of operation.

It will of course be understood that various changes in details of construction and arrangement of parts may be made by those skilled in the art without departing from the spirit of the invention as set forth in the appended claims.

I claim:

1. A materials testing machine comprising, in combination, a pair of vertical channel iron frame members, cross connections at their upper and lower ends, a vertically extending hydraulic cylinder and piston disposed between said channels at their lower end toward the front side thereof, an upper specimen engaging member supported near the upper ends of said channels, a lower specimen platen connected to said piston at a point offset from the axis of a specimen to be tested whereby eccentric forces are induced in said platen during a tension test, a moment arm connected to said platen and lying in a plane which extends vertically between said channels and also extends downwardly behind said loading cylinder, guides secured to said platen slidably engaging the front sides of said channels, and guides secured to said moment arm at the lower portion thereof for engaging the rear side of said channels whereby said eccentric forces are resisted and converted into a true axial loading force for the specimen throughout full vertical movement of the piston.

2. A materials testing machine comprising, in combination, opposed specimen engaging members, hydraulic loading mechanism connected to one of said members at a point offset from the axis of a test specimen whereby eccentric forces are produced in said last mentioned member, and means for resisting such eccentric forces including forward and rearward guideways facing in directions away from each other, an elongated moment arm secured to said last mentioned member and having guides operatively connected to the arm at one end thereof for engaging the forward guideways to transmit rearward forces thereto, and guides operatively connected to the arm at the other end thereof for engaging the rearward guideways to transmit forward forces thereto.

3. The combination set forth in claim 2 further characterized in that the forward guideways are located in a plane rearwardly of the specimen axis.

4. The combination set forth in claim 2 further characterized in that the elongated moment arm is disposed in a plane located to one side of the hydraulic loading mechanism and is adapted to be substantially parallel thereto, and the rearward guideways and guides being disposed so as to lie in a common transverse plane containing the cylinder normal to the axis thereof.

ALFRED SONNTAG.

REFERENCES CITED

The following references are of record in the file of this patent:

UNITED STATES PATENTS

| Number | Name | Date |
|---|---|---|
| 150,115 | Weston et al. | Apr. 21, 1874 |
| 993,700 | McKnight | May 30, 1911 |
| 1,033,623 | Schiller | July 23, 1912 |
| 1,066,447 | Cleveland | July 1, 1913 |
| 1,145,924 | Russell | July 13, 1915 |
| 1,564,197 | Brown | Dec. 8, 1925 |
| 1,865,070 | Amsler | June 28, 1932 |
| 2,055,787 | Dinzl | Sept. 29, 1936 |
| 2,075,968 | Von Heycekampf | Apr. 6, 1937 |